United States Patent
Yang

(10) Patent No.: US 8,866,402 B2
(45) Date of Patent: Oct. 21, 2014

(54) CURRENT REGULATOR DRIVE CIRCUIT SHUNTING CURRENT BY VOLTAGE-DIVIDING LOAD

(76) Inventor: Tai-Her Yang, Dzan-Hwa (TW)

(*) Notice: Subject to any disclaimer, the term of this patent is extended or adjusted under 35 U.S.C. 154(b) by 320 days.

(21) Appl. No.: 12/656,749

(22) Filed: Feb. 16, 2010

(65) Prior Publication Data

US 2011/0198925 A1    Aug. 18, 2011

(51) Int. Cl.
H05B 37/00 (2006.01)
H05B 33/08 (2006.01)

(52) U.S. Cl.
CPC ........ H05B 33/0809 (2013.01); H05B 33/0815 (2013.01); *Y02B 20/347* (2013.01)
USPC .............. 315/291; 315/294; 315/297; 307/32

(58) Field of Classification Search
CPC ................................. H05B 37/00; H05B 37/02
USPC .............. 315/209 R, 291, 294, 297
See application file for complete search history.

(56) References Cited

U.S. PATENT DOCUMENTS

| | | | | |
|---|---|---|---|---|
| 5,343,122 A | * | 8/1994 | Sugimori et al. | 315/209 R |
| 6,528,972 B2 | * | 3/2003 | Yang | 320/163 |
| 2007/0273299 A1 | * | 11/2007 | Miskin et al. | 315/250 |
| 2008/0074058 A1 | * | 3/2008 | Lee et al. | 315/291 |
| 2011/0057572 A1 | * | 3/2011 | Kit et al. | 315/185 R |

* cited by examiner

*Primary Examiner* — Tung X Le
*Assistant Examiner* — Jonathan Cooper
(74) *Attorney, Agent, or Firm* — Bacon & Thomas, PLLC

(57) ABSTRACT

The present invention is through the power control unit, which is connected with the voltage-dividing load in parallel, to perform shunt regulation for the current passing through the voltage-dividing load; in which the methods of the shunt regulation by the power control unit includes using the power control unit to perform shunt regulation of PWM, shunt regulation of conductive phase angle, or shunt regulation of switch type turn-on or cut-off, or regulating the impedance of the power control unit.

17 Claims, 5 Drawing Sheets

CURRENT REGULATOR DRIVE CIRCUIT SHUNTING CURRENT BY VOLTAGE-DIVIDING LOAD

BACKGROUND OF THE INVENTION (a) Field of the Invention

The present invention relates to a current regulator drive circuit shunting current by voltage-dividing load, wherein a main load and a voltage-dividing load connect in series, a power control unit connects in parallel with a voltage-dividing load, and a voltage detector is installed at input ends of an AC or DC power source, or at two ends of one of the main load and the voltage-dividing load or the total load of the two loads connected in series, and/or a load current detector is installed at output end of the power source or at load end, depending on signals detected by the voltage detector and/or the current detector, if the voltage detected by the voltage detector and/or the current detected by the current detector is lower than a predetermined value, the power control unit is operated to perform shunt regulation of pulse width modulation (PWM), shunt regulation of conductive phase angle, or shunt regulation of switch type turn-on or cut-off, or to regulate the impedance of the power control unit, to increase the current passing through the main load; and if the voltage detected by the voltage detector and/or the current detected by the current detector is higher than a predetermined value, the power control unit is operated to perform shunt regulation of pulse width modulation (PWM), shunt regulation of conductive phase angle, or shunt regulation of switch type turn-on or cut-off, or to regulate the impedance of the power control unit, to decrease the current passing through the main load.

(b) Description of the Prior Art

The conventional control method for limiting the current of the load driven by AC or DC power is often to turn on or cut off the switch connected with the load in series for current limiting regulation; when the ON-OFF control over the switch is implemented, the current change is significant, thus the shortcomings include that the lamps will show changes in light and shade if the load is lighting instrument, and electromagnetic interference is formed if the control over high frequency PWM is implemented.

SUMMARY OF THE INVENTION

The present invention relates to a current regulator drive circuit shunting current by voltage-dividing load, wherein a power control unit and a voltage-dividing load connect in parallel, to shunt regulation for the current passing through the voltage-dividing load; the methods of shunt regulation by the power control unit includes using the power control unit to perform shunt regulation of PWM, shunt regulation of conductive phase angle, or shunt regulation of switch type turn-on or cut-off, or regulating the impedance of the power control unit; because the variation is only on the impedance at two ends of the voltage-dividing load connected with the power control unit in parallel, the variation on the total impedance of the load is less, thus the lamps will show less changes in light and shade if the load is lighting instrument, and less electromagnetic interference is formed if the control over high frequency PWM is implemented.

Figure 1:
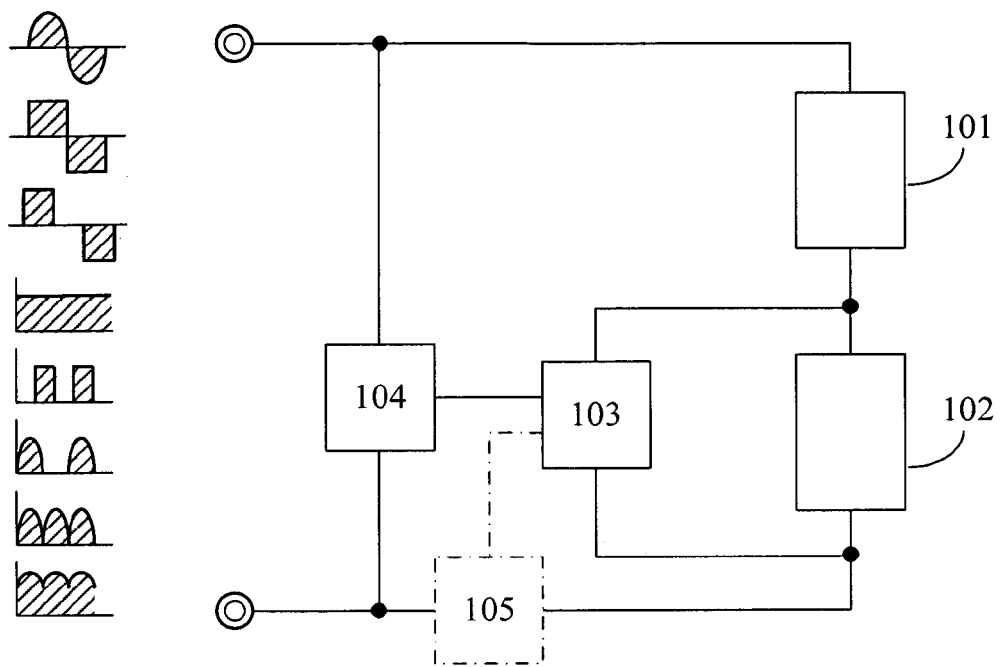
FIG. 1 is a schematic view showing the circuit blocks of the constitutive principle for the present invention.

DESCRIPTION OF MAIN COMPONENT SYMBOLS (101): Main load
(102): Voltage-dividing load
(103): Power control unit
(104): Voltage detector
(105): Current detector
(201): DC main load
(202): DC voltage-dividing load
(203): DC power control device
(204): DC voltage detector
(205): DC current detector
(301): AC main load
(302): AC voltage-dividing load
(303): AC power control device
(304): AC voltage detector
(305): AC current detector
(401): Main light-emitting diode (LED)
(402): Voltage-dividing light-emitting diode (LED)
(403): DC power control device
(404): Voltage detector
(405): Current detector
(501): AC main light-emitting diode (LED)
(502): AC voltage-dividing light-emitting diode (LED)
(503): AC power control device
(504): AC voltage detector
(505): AC current detector
(601): Electrothermal main load
(602): Electrothermal voltage-dividing load
(603): Power control unit
(604): Voltage detector
(605): Current detector
(701): DC main load
(702): Voltage-dividing Zener diode
(703): DC power control device
(704): DC voltage detector
(705): DC current detector
(801): AC main load
(802): Voltage-dividing two-way Zener diode
(803): AC power control device
(804): AC voltage detector
(805): AC current detector
(901): AC-DC main load
(902): Rectifier diode
(903): Power control unit
(904): Voltage detector
(905): Current detector (1001): Main load
(1002): Voltage-dividing impedance
(1003): Power control unit
(1004): Voltage detector
(1005): Current detector

DETAILED DESCRIPTION OF THE PREFERRED EMBODIMENTS

The present invention relates to a current regulator drive circuit shunting current by voltage-dividing load, wherein a main load and a voltage-dividing load connect in series, a power control unit and a voltage-dividing load connect in parallel, and a voltage detector is installed at input end of an AC or DC power source, or at two ends of one of the main load and the voltage-dividing load or the total load of the two loads connected in series, and/or a load current detector is installed at output end of the power source or at load end, depending on signals detected by the voltage detector and/or the current detector, if the voltage detected by the voltage detector and/or the current detected by the current detector is lower than a predetermined value, the power control unit is operated to perform shunt regulation of pulse width modulation (PWM), shunt regulation of conductive phase angle, or shunt regulation of switch type turn-on or cut-off, or to regulate the impedance of the power control unit, to increase the current passing through the main load; and if the voltage detected by the voltage detector and/or the current detected by the current detector is higher than a predetermined value, the power control unit is operated to perform shunt regulation of pulse width modulation (PWM), shunt regulation of conductive phase angle, or shunt regulation of switch type turn-on or cut-off, or to regulate the impedance of the power control unit, to decrease the current passing through the main load.

The present invention relates to a current regulator drive circuit shunting current by voltage-dividing load, wherein a power control unit and a voltage-dividing load connect in parallel, to shunt regulation for the current passing through the voltage-dividing load; the methods of shunt regulation by the power control unit includes using the power control unit to perform shunt regulation of PWM, shunt regulation of conductive phase angle, or shunt regulation of switch type turn-on or cut-off, or regulating the impedance of the power control unit; because the variation is only on the impedance at two ends of the voltage-dividing load connected with the power control unit in parallel, the variation on the total impedance of the load is less, thus the lamps will show less changes in light and shade if the load is lighting instrument, and less electromagnetic interference is formed if the control over high frequency PWM is implemented.

The current regulator drive circuit shunting current by voltage-dividing load is applied to the load driven by AC power source or DC power source.

FIG. 1 is a schematic view showing the circuit blocks of the constitutive principle for the present invention, the main components including:

main load (101): related to a main load driven by AC, DC, or pulsating DC power, which is constituted by one or more than one kind of main loads, including electric energy to luminous energy main load, electric energy to thermal energy main load, electrical energy to mechanical energy main load, electrical energy to chemical energy main load, or electrical energy to acoustic energy main load;

voltage-dividing load (102): related to a voltage-dividing load, which is same or different with the main load (101), driven by AC, DC, or pulsating DC power, constituted by one or more than one kind of voltage-dividing loads including electric energy to luminous energy voltage-dividing load, electric energy to thermal energy voltage-dividing load, electrical energy to mechanical energy voltage-dividing load, electrical energy to chemical energy voltage-dividing load, or electrical energy to acoustic energy voltage-dividing load, connected with the main load (101) in series, and connected with the power control unit (103) in parallel, for being driven by electric energy, and for the current passing through the voltage-dividing load (102) to be shunted regulation by the power control unit (103);

power control unit (103): constituted by electromechanical switch device, solid-state semiconductor-type switch device, or solid-state semiconductor-type linear variable impedance device, for being controlled by the voltage detector (104) and/or the current detector (105), to perform shunt regulation of PWM, shunt regulation of conductive phase angle, or shunt regulation of switch type turn-on or cut-off, or to regulate the impedance of the power control unit (103), to shunt regulation for the current passing through the voltage-dividing load (102);

voltage detector (104): related to a voltage detector constituted by electromechanical and/or solid-state electronic components, for detecting the supply voltage, or the value of the voltage at two ends of one of the main load (101) and the voltage-dividing load (102), or of the total load of the both connected in series, to regulate the power control unit (103) over the following functions, including:

if the voltage detected by the voltage detector (104) is lower than a predetermined value, the power control unit (103) is operated to perform shunt regulation of PWM, shunt regulation of conductive phase angle, or shunt regulation of switch type turn-on or cut-off, or to regulate the impedance of the power control unit (103), to increase the current passing through the main load (101); or if the voltage detected by the voltage detector (104) is higher than a predetermined value, the power control unit (103) is operated to perform shunt regulation of PWM, shunt regulation of conductive phase angle, or shunt regulation of switch type turn-on or cut-off, or to regulate the impedance of the power control unit (103), to decrease the current passing through the main load (101); and current detector (105): related to a current detector constituted by electromechanical and/or solid-state electronic components, for detecting the value of the current passing through one of the main load (101) and the voltage-dividing load (102), or the total load of the both connected in series, to regulate the power control unit (103) over the following functions, including:

if the current detected by the current detector (105) is lower than a predetermined value, the power control unit (103) is operated to perform shunt regulation of PWM, shunt regulation of conductive phase angle, or shunt regulation of switch type turn-on or cut-off, or to regulate the impedance of the power control unit (103), to increase the current passing through the main load (101); or if the current detected by the current detector (105) is higher than a predetermined value, the power control unit (103) is operated to perform shunt regulation of PWM, shunt regulation of conductive phase angle, or shunt regulation of switch type turn-on or cut-off, or to regulate the impedance of the power control unit (103), to decrease the current passing through the main load (101).

Figure 2:
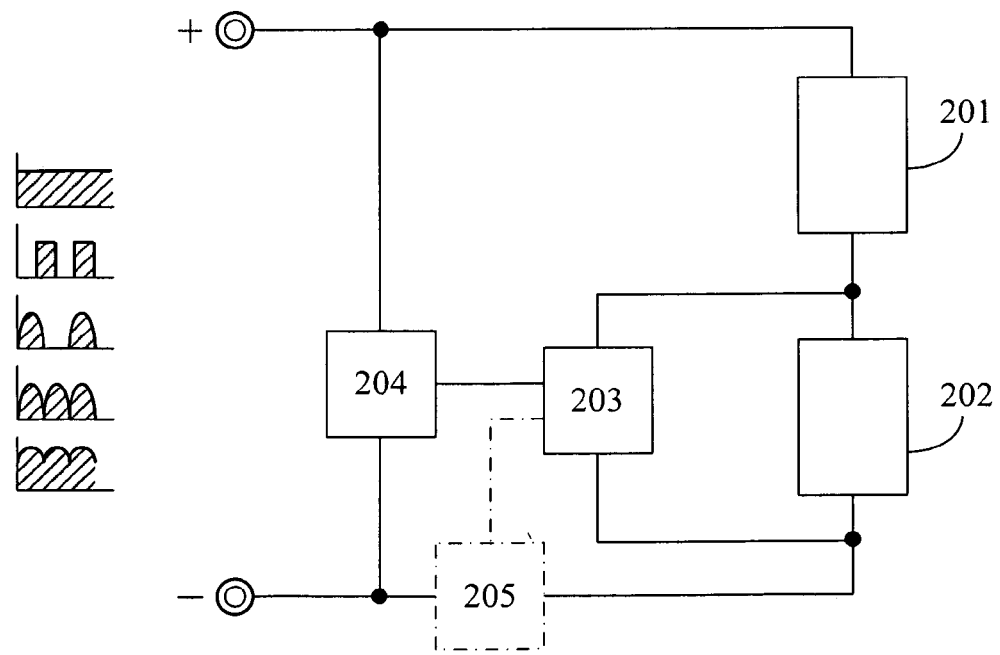
FIG. 2 is a schematic view showing the circuit blocks of the present invention applied to DC power source.

FIG. 2 is a schematic view showing the circuit blocks of the present invention applied to DC power source, the main components including:

- DC main load (201): related to a main load driven by DC or pulsating DC power, which is constituted by one or more than one kind of main loads, including DC electric energy to luminous energy main load, DC electric energy to thermal energy main load, DC electrical energy to mechanical energy main load, DC electrical energy to chemical energy main load, or DC electrical energy to acoustic energy main load;
- DC voltage-dividing load (202): related to a voltage-dividing load, which is same or different with the DC main load (201), driven by DC or pulsating DC power, constituted by one or more than one kind of voltage-dividing loads including DC electric energy to luminous energy voltage-dividing load, DC electric energy to thermal energy voltage-dividing load, DC electrical energy to mechanical energy voltage-dividing load, DC electrical energy to chemical energy voltage-dividing load, or DC electrical energy to acoustic energy voltage-dividing load, connected with the DC main load (201) in series, and connected with the DC power control device (203) in parallel, for being driven by electric energy, and for the current passing through the DC voltage-dividing load (202) to be shunted regulation by the DC power control device (203);
- DC power control device (203): constituted by electromechanical switch device, solid-state semiconductor-type switch device, or solid-state semiconductor-type linear variable impedance device, for being controlled by the DC voltage detector (204) and/or the DC current detector (205), to perform shunt regulation of PWM, shunt regulation of conductive phase angle, or shunt regulation of switch type turn-on or cut-off, or to regulate the impedance of the DC power control device (203), to shunt regulation for the current passing through the DC voltage-dividing load (202);
- DC voltage detector (204): related to a DC voltage detector constituted by electromechanical and/or solid-state electronic components, for detecting the DC supply voltage, or the value of the voltage at two ends of one of the DC main load (201) and the DC voltage-dividing load (202), or of the total load of the both connected in series, to regulate the DC power control device (203) over the following functions, including:

if the voltage detected by the DC voltage detector (204) is lower than a predetermined value, the DC power control device (203) is operated to perform shunt regulation of PWM or shunt regulation of switch type turn-on or cut-off, or to regulate the impedance of the DC power control device (203), to increase the current passing through the DC main load (201); or if the voltage detected by the DC voltage detector (204) is higher than a predetermined value, the DC power control device (203) is operated to perform shunt regulation of PWM or shunt regulation of switch type turn-on or cut-off, or to regulate the impedance of the DC power control device (203), to decrease the current passing through the DC main load (201); and

- DC current detector (205): related to a DC current detector constituted by electromechanical and/or solid-state electronic components, for detecting the value of the current passing through one of the DC main load (201) and the DC voltage-dividing load (202), or the total load of the both connected in series, to regulation the DC power control device (203) over the following functions, including:

if the current detected by the DC current detector (205) is lower than a predetermined value, the DC power control device (203) is operated to perform shunt regulation of PWM or shunt regulation of switch type turn-on or cut-off, or to regulate the impedance of the DC power control device (203), to increase the current passing through the DC main load (201); or if the current detected by the DC current detector (205) is higher than a predetermined value, the DC power control device (203) is operated to perform shunt regulation of PWM or shunt regulation of switch type turn-on or cut-off, or to regulate the impedance of the DC power control device (203), to decrease the current passing through the DC main load (201).

Figure 3:
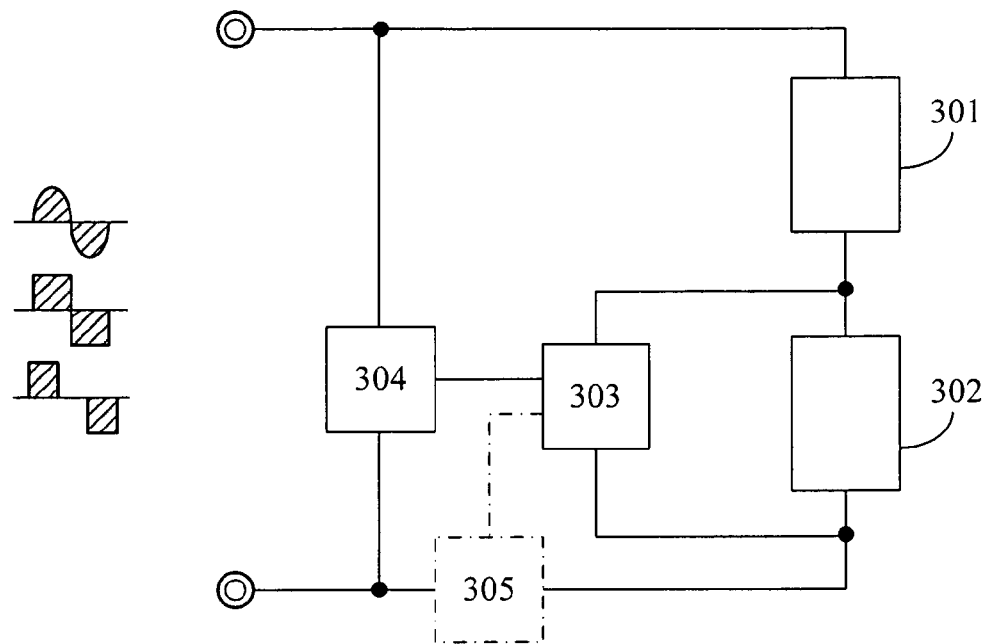
FIG. 3 is a schematic view showing the circuit blocks of the present invention applied to AC power source.

FIG. 3 is a schematic view showing the circuit blocks of the present invention applied to AC power source, the main components including:

- AC main load (301): related to a main load driven by AC power, including one or more than one kind of main loads including AC electric energy to luminous energy main load, AC electric energy to thermal energy main load, AC electrical energy to mechanical energy main load, AC electrical energy to chemical energy main load, or AC electrical energy to acoustic energy main load;
- AC voltage-dividing load (302): related to a voltage-dividing load, which is same or different with the AC main load (301), driven by AC power, constituted by one or more than one kind of voltage-dividing loads including AC electric energy to luminous energy voltage-dividing load, AC electric energy to thermal energy voltage-dividing load, AC electrical energy to mechanical energy voltage-dividing load, AC electrical energy to chemical energy voltage-dividing load, or AC electrical energy to acoustic energy voltage-dividing load, connected with the AC main load (301) in series, and connected with the AC power control device (303) in parallel, for being driven by electric energy, and for the current passing through the AC voltage-dividing load (302) to be shunted regulation by the AC power control device (303);
- AC power control device (303): constituted by electromechanical switch device, solid-state semiconductor-type switch device, or solid-state semiconductor-type linear variable impedance device, for being controlled by the AC voltage detector (304) and/or the AC current detector (305), to perform shunt regulation of PWM, shunt regulation of conductive phase angle, or shunt regulation of switch type turn-on or cut-off, or to regulate the impedance of the AC power control device (303), to shunt regulation for the current passing through the AC voltage-dividing load (302);
- AC voltage detector (304): related to a AC voltage detector constituted by electromechanical and/or solid-state electronic components, for detecting the AC supply voltage, or the value of the voltage at two ends of one of the AC main load (301) and the AC voltage-dividing load (302), or of the total load of the both connected in series, to regulate the AC power control device (303) over the following functions, including:

if the voltage detected by the AC voltage detector (304) is lower than a predetermined value, the AC power control device (303) is operated to perform shunt regulation of PWM, shunt regulation of conductive phase angle, or shunt regulation of switch type turn-on or cut-off, or to regulate the impedance of the AC power control device (303), to increase the current passing through the AC main load (301); or if the voltage detected by the AC voltage detector (304) is higher than a predetermined value, the AC power control device (303) is operated to perform shunt regulation of PWM, shunt regulation of conductive phase angle, or shunt regulation of switch type turn-on or cut-off, or to regulate the impedance of the AC power control device (303), to decrease the current passing through the AC main load (301); and AC current detector (305): related to a AC current detector constituted by electromechanical and/or solid-state electronic components, for detecting the value of the current passing through one of the AC main load (301) and the AC voltage-dividing load (302), or the total load of the both connected in series, to regulate the AC power control device (303) over the following functions, including:

if the current detected by the AC current detector (305) is lower than a predetermined value, the AC power control device (303) is operated to perform shunt regulation of PWM, shunt regulation of conductive phase angle, or shunt regulation of switch type turn-on or cut-off, or to regulate the impedance of the AC power control device (303), to increase the current passing through the AC main load (301); or if the current detected by the AC current detector (305) is higher than a predetermined value, the AC power control device (303) is operated to perform shunt regulation of PWM, shunt regulation of conductive phase angle, or shunt regulation of switch type turn-on or cut-off, or to regulate the impedance of the AC power control device (303), to decrease the current passing through the AC main load (301).

Figure 4:
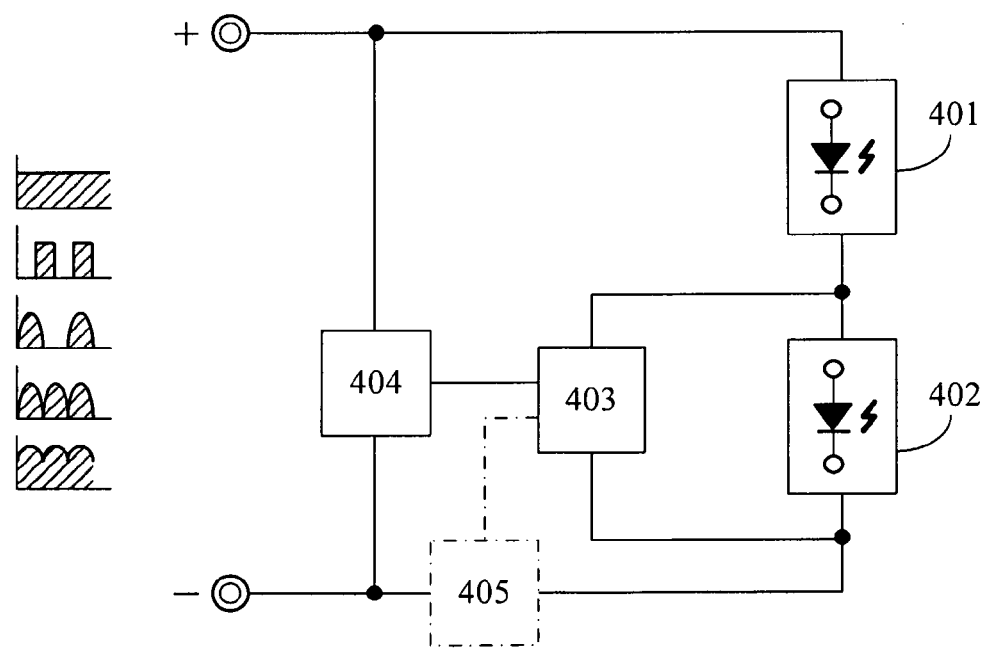
FIG. 4 is a schematic view showing the circuit blocks of the first embodiment of the present invention.

The current regulator drive circuit shunting current by voltage-dividing load of the present invention is widely applied to the load driven by various types of electric energy, the common application cases provided as following:

FIG. 4 shows the first embodiment of the present invention, for applying to the light-emitting diode (LED) driven by DC power source, the main components including:

main light-emitting diode (LED) (401): constituted by one or more LEDs connected in series, connected in parallel, or connected in series-parallel, for being driven by DC power or pulsating DC power;

voltage-dividing light-emitting diode (LED) (402): constituted by one or more LEDs connected in series, connected in parallel, or connected in series-parallel, to be connected with the main light-emitting diode (LED) (401) in series, and to be connected with DC power control device (403) in parallel, for being driven by DC power or pulsating DC power, and for the current passing through the voltage-dividing light-emitting diode (LED) (402) to be shunted regulation by the DC power control device (403);

DC power control device (403): constituted by electromechanical switch device, solid-state semiconductor-type switch device, or solid-state semiconductor-type linear variable impedance device, to be connected with two ends of the voltage-dividing light-emitting diode (LED) (402) in parallel, for being controlled by the voltage detector (404) and/or the current detector (405), to perform shunt regulation of PWM, shunt regulation of conductive phase angle, or shunt regulation of switch type turn-on or cut-off, or to regulate the impedance of the DC power control device (403), to shunt regulation for the current passing through the voltage-dividing light-emitting diode (LED) (402);

voltage detector (404): related to a voltage detector constituted by electromechanical and/or solid-state electronic components, for detecting the supply voltage, or the value of the voltage at two ends of one of the main light-emitting diode (LED) (401) and the voltage-dividing light-emitting diode (LED) (402), or of the total load of the both connected in series, to regulated the DC power control device (403) over the following functions, including:

if the voltage detected by the voltage detector (404) is lower than a predetermined value, the DC power control device (403) is operated to perform shunt regulation of PWM, shunt regulation of conductive phase angle, or shunt regulation of switch type turn-on or cut-off, or to regulate the impedance of the DC power control device (403), to increase the current passing through the main light-emitting diode (LED) (401); or if the voltage detected by the voltage detector (404) is higher than a predetermined value, the DC power control device (403) is operated to perform shunt regulation of PWM, shunt regulation of conductive phase angle, or shunt regulation of switch type turn-on or cut-off, or to regulate the impedance of the DC power control device (403), to decrease the current passing through the main light-emitting diode (LED) (401); and current detector (405): related to a current detector constituted by electromechanical and/or solid-state electronic components, for detecting the value of the current passing through one of the main light-emitting diode (LED) (401) and the voltage-dividing light-emitting diode (LED) (402), or the total load of the both connected in series, to regulate the DC power control device (403) over the following functions, including:

if the current detected by the current detector (405) is lower than a predetermined value, the DC power control device (403) is operated to perform shunt regulation of PWM, shunt regulation of conductive phase angle, or shunt regulation of switch type turn-on or cut-off, or to regulate the impedance of the DC power control device (403), to increase the current passing through the main light-emitting diode (LED) (401); or if the current detected by the current detector (405) is higher than a predetermined value, the DC power control device (403) is operated to perform shunt regulation of PWM, shunt regulation of conductive phase angle, or shunt regulation of switch type turn-on or cut-off, or to regulate the impedance of the DC power control device (403), to decrease the current passing through the main light-emitting diode (LED) (401).

Figure 5:
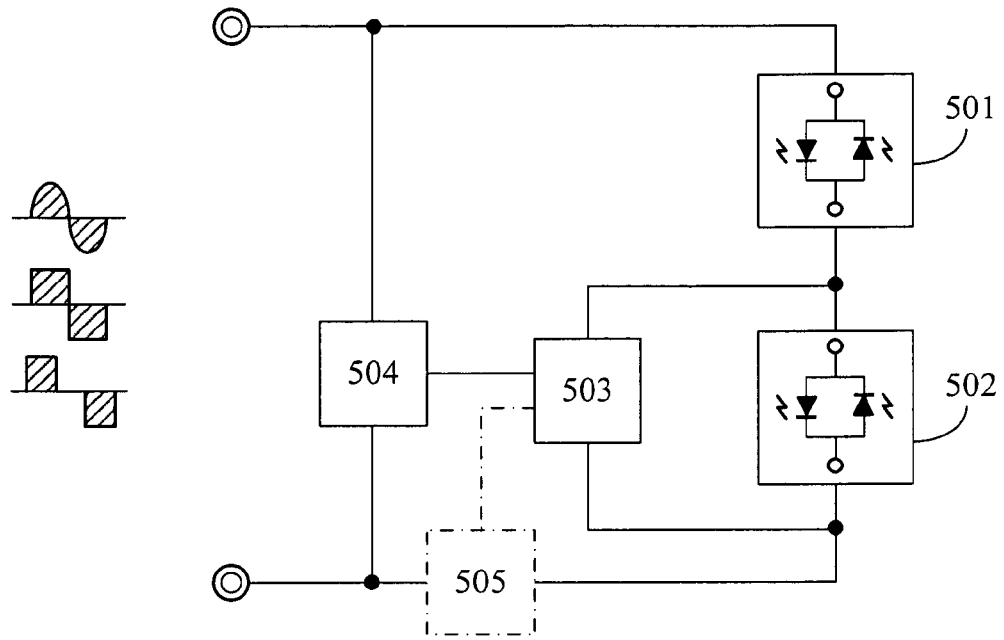
FIG. 5 is a schematic view showing the circuit blocks of the second embodiment of the present invention.

FIG. 5 shows the second embodiment of the present invention, for applying to the AC LED driven by AC power source, the main components including:

AC main light-emitting diode (LED) (501): constituted by one or more AC LEDs connected in series, connected in parallel, or connected in series-parallel, in which AC LED is constituted by two or more LEDs parallel connected in reverse polarity, for being driven by AC power;

AC voltage-dividing light-emitting diode (LED) (502): constituted by one or more AC LEDs connected in series, connected in parallel, or connected in series-parallel, in which AC LED is constituted by two or more LEDs parallel connected in reverse polarity, to be connected with the AC main light-emitting diode (LED) (501) in series, and to be connected with AC power control device (503) in parallel, for being driven by AC power, and for the current passing through the AC voltage-dividing light-emitting diode (LED) (502) to be shunted regulation by the AC power control device (503);

AC power control device (503): constituted by electromechanical switch device, solid-state semiconductor-type switch device, or solid-state semiconductor-type linear variable impedance device, to be connected with two ends of the AC voltage-dividing light-emitting diode (LED)(502) in parallel, for being controlled by the AC voltage detector (504) and/or the AC current detector (505), to perform shunt regulation of PWM, shunt regulation of conductive phase angle, or shunt regulation of switch type turn-on or cut-off, or to regulate the impedance of the AC power control device (503), to shunt regulation for the current passing through the AC voltage-dividing light-emitting diode (LED) (502);

AC voltage detector (504): related to a AC voltage detector constituted by electromechanical and/or solid-state electronic components, for detecting the AC supply voltage, or the value of the voltage at two ends of one of the AC main light-emitting diode (LED) (501) and the AC voltage-dividing light-emitting diode (LED) (502), or of the total load of the both connected in series, to regulate the AC power control device (503) over the following functions, including:

if the voltage detected by the AC voltage detector (504) is lower than a predetermined value, the AC power control device (503) is operated to perform shunt regulation of PWM, shunt regulation of conductive phase angle, or shunt regulation of switch type turn-on or cut-off, or to regulate the impedance of the AC power control device (503), to increase the current passing through the AC main light-emitting diode (LED) (501); or if the voltage detected by the AC voltage detector (504) is higher than a predetermined value, the AC power control device (503) is operated to perform shunt regulation of PWM, shunt regulation of conductive phase angle, or shunt regulation of switch type turn-on or cut-off, or to regulate the impedance of the AC power control device (503), to decrease the current passing through the AC main light-emitting diode (LED) (501); and AC current detector (505): related to a AC current detector constituted by electromechanical and/or solid-state electronic components, for detecting the value of the current passing through one of the AC main light-emitting diode (LED) (501) and the AC voltage-dividing light-emitting diode (LED) (502), or the total load of the both connected in series, to regulate the AC power control device (503) over the following functions, including:

if the current detected by the AC current detector (505) is lower than a predetermined value, the AC power control device (503) is operated to perform shunt regulation of PWM, shunt regulation of conductive phase angle, or shunt regulation of switch type turn-on or cut-off, or to regulate the impedance of the AC power control device (503), to increase the current passing through the AC main light-emitting diode (LED) (501); or if the current detected by the AC current detector (505) is higher than a predetermined value, the AC power control device (503) is operated to perform shunt regulation of PWM, shunt regulation of conductive phase angle, or shunt regulation of switch type turn-on or cut-off, or to regulate the impedance of the AC power control device (503), to decrease the current passing through the AC main light-emitting diode (LED) (501).

Figure 6:
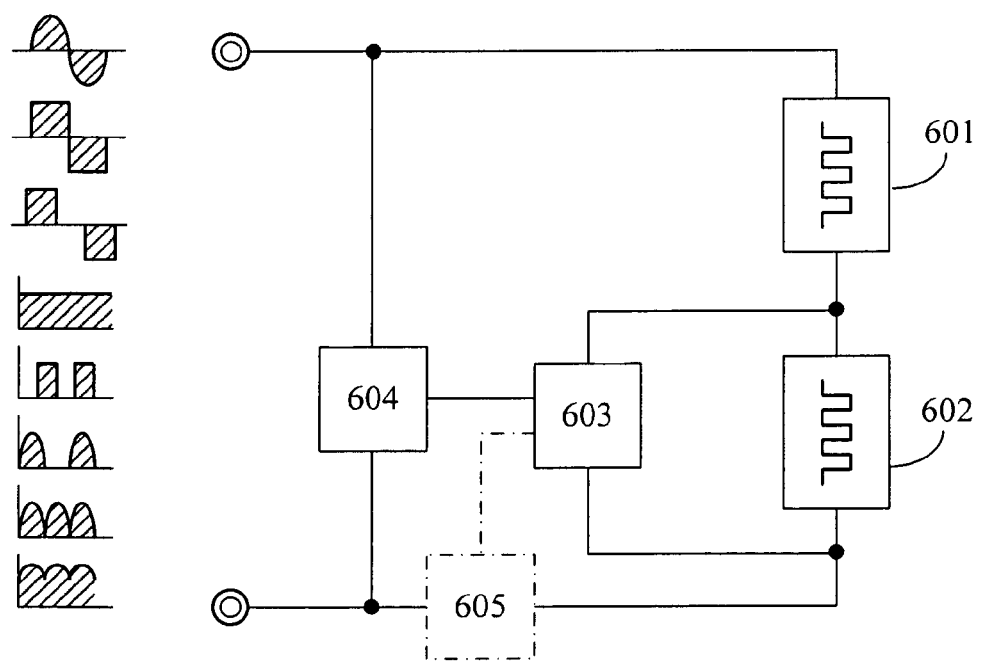
FIG. 6 is a schematic view showing the circuit blocks of the thirst embodiment of the present invention.

FIG. 6 shows the third embodiment of the present invention, for applying to electrothermal device driven by AC or DC power source, the main components including:

electrothermal main load (601): related to a AC or DC power driven main load, which converts electric energy to thermal energy;

electrothermal voltage-dividing load (602): constituted by a AC or DC power driven electrothermal voltage-dividing load, which converts electric energy to thermal energy, to be connected with the electrothermal main load (601) in series, and connected with the power control unit (603) in parallel, for being driven by electric energy, and for the current passing through the electrothermal voltage-dividing load (602) to be shunted regulation by the power control unit (603);

power control unit (603): related to AC or DC power control unit constituted by electromechanical switch device, solid-state semiconductor-type switch device, or solid-state semiconductor-type linear variable impedance device, for being controlled by the voltage detector (604) and/or the current detector (605), to perform shunt regulation of PWM, shunt regulation of conductive phase angle, or shunt regulation of switch type turn-on or cut-off, or to regulate the impedance of the power control unit (603), to shunt regulation for the current passing through the electrothermal voltage-dividing load (602);

voltage detector (604): related to a voltage detector constituted by electromechanical and/or solid-state electronic components, for detecting the supply voltage, or the value of the voltage at two ends of one of the electrothermal main load (601) and the electrothermal voltage-dividing load (602), or of the total load of the both connected in series, to regulate the power control unit (603) over the following functions, including:

if the voltage detected by the voltage detector (604) is lower than a predetermined value, the power control unit (603) is operated to perform shunt regulation of PWM, shunt regulation of conductive phase angle, or shunt regulation of switch type turn-on or cut-off; or to regulate the impedance of the power control unit (603), to increase the current passing through the electrothermal main load (601); or if the voltage detected by the voltage detector (604) is higher than a predetermined value, the power control unit (603) is operated to perform shunt regulation of PWM, shunt regulation of conductive phase angle, or shunt regulation of switch type turn-on or cut-off, or to regulate the impedance of the power control unit (603), to decrease the current passing through the electrothermal main load (601); and current detector (605): related to a current detector constituted by electromechanical and/or solid-state electronic components, for detecting the value of the current passing through one of the electrothermal main load (601) and the electrothermal voltage-dividing load (602), or the total load of the both connected in series, to regulate the power control unit (603) over the following functions, including:

if the current detected by the current detector (605) is lower than a predetermined value, the power control unit (603) is operated to perform shunt regulation of PWM, shunt regulation of conductive phase angle, or shunt regulation of switch type turn-on or cut-off, or to regulate the impedance of the power control unit (603), to increase the current passing through the electrothermal main load (601); or if the current detected by the current detector (605) is higher than a predetermined value, the power control unit (603) is operated to perform shunt regulation of PWM, shunt regulation of conductive phase angle, or shunt regulation of switch type turn-on or cut-off, or to regulate the impedance of the power control unit (603), to decrease the current passing through the electrothermal main load (601).

Figure 7:
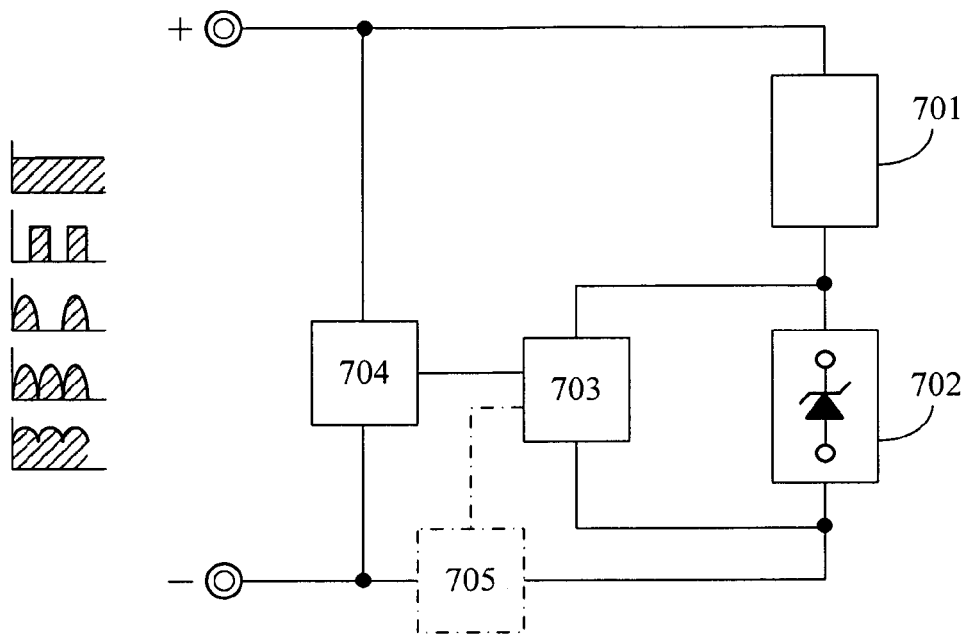
FIG. 7 is a schematic view showing the circuit blocks of the 4th embodiment of the present invention.

FIG. 7 shows the 4th embodiment of the present invention, for applying to a DC power source driven DC main load, which has the Zener diode as the voltage-dividing component, the main components including:

- DC main load (701): related to a main load driven by DC or pulsating DC power, constituted by one or more than one kind of main loads including DC electric energy to luminous energy main load, DC electric energy to thermal energy main load, DC electric energy to mechanical energy main load, DC electric energy to chemical energy main load, and DC electric energy to acoustic energy main load;
- voltage-dividing Zener diode (702): constituted by one or more Zener Diodes connected in series, connected in parallel, or connected in series-parallel, arranged to be connected with the DC main load (701) in series, and connected with DC power control device (703) in parallel, for being driven by DC or pulsating DC power, and for the current passing through the voltage-dividing Zener diode (702) to be shunted regulation by the DC power control device (703);
- DC power control device (703): constituted by electromechanical switch device, solid-state semiconductor-type switch device, or solid-state semiconductor-type linear variable impedance device, for being connected with two ends of the voltage-dividing Zener diode (702) in parallel, and for being controlled by the DC voltage detector (704) and/or the DC current detector (705), to perform shunt regulation of PWM, shunt regulation of conductive phase angle, or shunt regulation of switch type turn-on or cut-off, or to regulate the impedance of the DC power control device (703), to shunt regulation for the current passing through the voltage-dividing Zener diode (702);
- DC voltage detector (704): related to a DC voltage detector constituted by electromechanical and/or solid-state electronic components, for detecting the DC supply voltage, or the value of the voltage at two ends of one of the DC main load (701) and the voltage-dividing Zener diode (702), or of the total load of the both connected in series, to control the DC power control device (703) over the following functions, including:
  if the voltage detected by the DC voltage detector (704) is lower than a predetermined value, the DC power control device (703) is operated to perform shunt regulation of PWM or shunt regulation of switch type turn-on or cut-off, or to regulate the impedance of the DC power control device (703), to increase the current passing through the DC main load (701); or
  if the voltage detected by the DC voltage detector (704) is higher than a predetermined value, the DC power control device (703) is operated to perform shunt regulation of PWM or shunt regulation of switch type turn-on or cut-off, or to regulate the impedance of the DC power control device (703), to decrease the current passing through the DC main load (701); and
  - DC current detector (705): related to a DC current detector constituted by electromechanical and/or solid-state electronic components, for detecting the value of the current passing through one of the DC main load (701) and the voltage-dividing Zener diode (702), or the total load of the both connected in series, to regulate the DC power control device (703) over the following functions, including:
    if the current detected by the DC current detector (705) is lower than a predetermined value, the DC power control device (703) is operated to perform shunt regulation of PWM or shunt regulation of switch type turn-on or cut-off, or to regulate the impedance of the DC power control device (703), to increase the current passing through the DC main load (701); or
    if the current detected by the DC current detector (705) is higher than a predetermined value, the DC power control device (703) is operated to perform shunt regulation of PWM or shunt regulation of switch type turn-on or cut-off, or to regulate the impedance of the DC power control device (703), to decrease the current passing through the DC main load (701).

Figure 8:
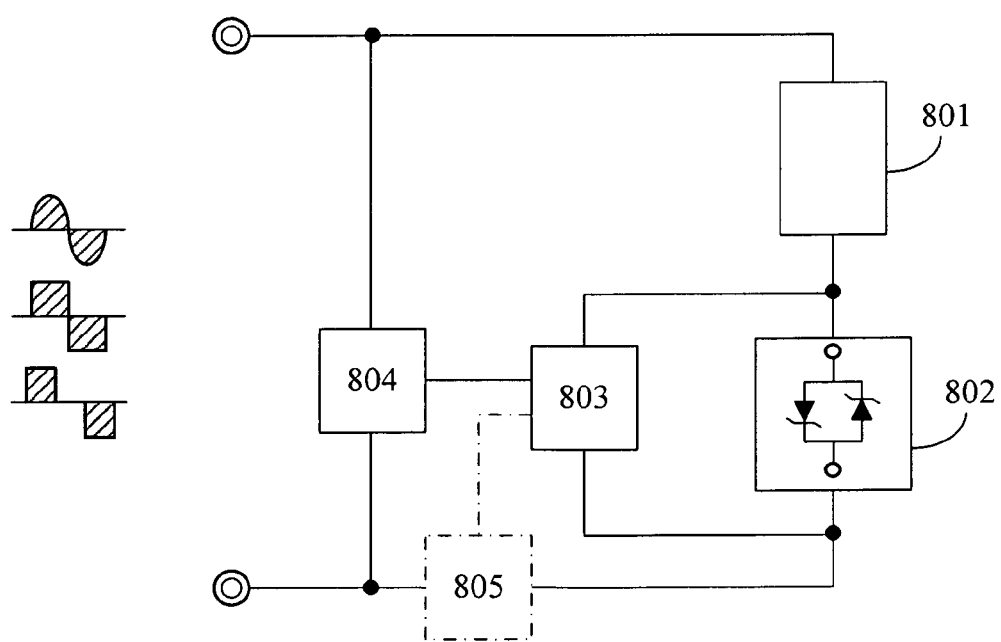
FIG. 8 is a schematic view showing the circuit blocks of the 5th embodiment of the present invention.

FIG. 8 shows the 5th embodiment of the present invention, for applying to an AC power source driven AC main load, which has two-way Zener diode as the voltage-dividing component, the main components including:

- AC main load (801): related to a main load driven by AC power, constituted by one or more than one kind of main loads including AC electric energy to luminous energy main load, AC electric energy to thermal energy main load, AC electric energy to mechanical energy main load, AC electric energy to chemical energy main load, and AC electric energy to acoustic energy main load;
- voltage-dividing two-way Zener diode (802): constituted by two or more Zener Diodes connected, with different working polarity, in series or connected in parallel, and arranged to be connected with the AC main load (801) in series, and connected with AC power control device (803) in parallel, for being driven by AC power, and for the current passing through the voltage-dividing two-way Zener diode (802) to be shunted regulation by the AC power control device (803);
- AC power control device (803): constituted by electromechanical switch device, solid-state semiconductor-type switch device, or solid-state semiconductor-type linear variable impedance device, for being connected with two ends of the voltage-dividing two-way Zener diode (802) in parallel, and for being controlled by the AC voltage detector (804) and/or the AC current detector (805), to perform shunt regulation of PWM, shunt regulation of conductive phase angle, or shunt regulation of switch type turn-on or cut-off, or to regulate the impedance of the AC power control device (803), to shunt regulation for the current passing through the voltage-dividing two-way Zener diode (802);
- AC voltage detector (804): related to a AC voltage detector constituted by electromechanical and/or solid-state electronic components, for detecting the AC supply voltage, or the value of the voltage at two ends of one of the AC main load (801) and the voltage-dividing two-way Zener diode (802), or of the total load of the both connected in series, to control the AC power control device (803) over the following functions, including:
  if the voltage detected by the AC voltage detector (804) is lower than a predetermined value, the AC power control device (803) is operated to perform shunt regulation of PWM, shunt regulation of conductive phase angle, or shunt regulation of switch type turn-on or cut-off, or to regulate the impedance of the AC power control device (803), to lower the total impedance of the load, and to increase the current passing through the AC main load (801); or
  if the voltage detected by the AC voltage detector (804) is higher than a predetermined value, the AC power control device (803) is operated to perform shunt regulation of PWM, shunt regulation of conductive phase angle, or shunt regulation of switch type turn-on or cut-off, or to regulate the impedance of the AC power control device (803), to decrease the current passing through the AC main load (801); and AC current detector (805): related to a AC current detector constituted by electromechanical and/or solid-state electronic components, for detecting the value of the current passing through one of the AC main load (801) and the voltage-dividing two-way Zener diode (802), or the total load of the both connected in series, to regulate the AC power control device (803) over the following functions, including:

if the current detected by the AC current detector (805) is lower than a predetermined value, the AC power control device (803) is operated to perform shunt regulation of PWM, shunt regulation of conductive phase angle, or shunt regulation of switch type turn-on or cut-off, or to regulate the impedance of the AC power control device (803), to increase the current passing through the AC main load (801); or if the current detected by the AC current detector (805) is higher than a predetermined value, the AC power control device (803) is operated to perform shunt regulation of PWM, shunt regulation of conductive phase angle, or shunt regulation of switch type turn-on or cut-off, or to regulate the impedance of the AC power control device (803), to decrease the current passing through the AC main load (801).

Figure 9:
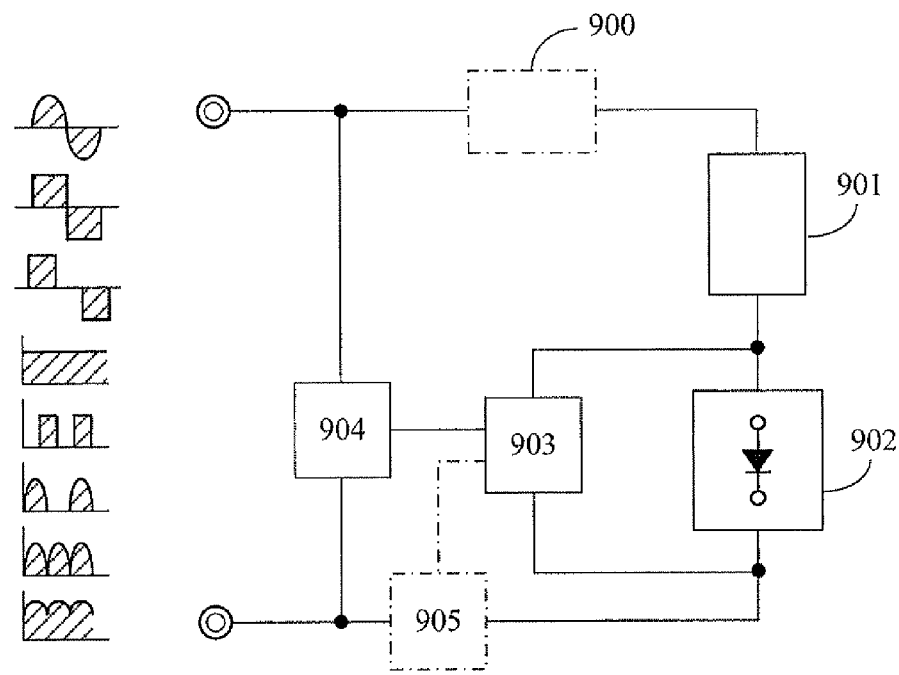
FIG. 9 is a schematic view showing the circuit blocks of the 6th embodiment of the present invention.

FIG. 9 shows the 6th embodiment of the present invention, for applying to AC-DC main load, which has the rectifier diode as the AC/DC switching and voltage-dividing component, driven by AC or DC power source, the main components including:

AC-DC main load (901): related to a main load driven by AC or DC power, constituted by one or more than one kind of main loads including AC or DC electric energy to luminous energy main load, AC or DC electric energy to thermal energy main load, AC or DC electric energy to mechanical energy main load, AC or DC electric energy to chemical energy main load, and AC or DC electric energy to acoustic energy main load;

rectifier diode (902): constituted by one or more rectifier diodes connected in series, connected in parallel, or connected in series-parallel, and arranged to be connected with the AC-DC main load (901) in series, and connected with power control unit (903) in parallel, to serve as a switching component for rectifying AC power source into half-wave DC, and to serve as a voltage-dividing component for the current with another flow direction separated by the rectifier diode (902) to be parallelly shunted regulation by the power control unit (903);

power control unit (903): constituted by electromechanical switch device, solid-state semiconductor-type switch device, or solid-state semiconductor-type linear variable impedance device, for being controlled by the voltage detector (904) and/or the current detector (905), to perform shunt regulation of PWM, shunt regulation of conductive phase angle, or shunt regulation of switch type turn-on or cut-off, or to regulate the impedance of the power control unit (903), to shunt regulation for the current passing through the rectifier diode (902) and the current with another flow direction separated by the rectifier diode (902);

voltage detector (904): related to a voltage detector constituted by electromechanical and/or solid-state electronic components, for detecting the supply voltage, or the value of the voltage at two ends of one of the AC-DC main load (901) and the rectifier diode (902), or of the total load of the both connected in series, to regulate the power control unit (903) over the following functions, including:

if the voltage detected by the voltage detector (904) is lower than a predetermined value, the power control unit (903) is operated to perform shunt regulation of PWM, shunt regulation of conductive phase angle, or shunt regulation of switch type turn-on or cut-off, or to regulate the impedance of the power control unit (903), to increase the current passing through the AC-DC main load (901); or if the voltage detected by the voltage detector (904) is higher than a predetermined value, the power control unit (903) is operated to perform shunt regulation of PWM, shunt regulation of conductive phase angle, or shunt regulation of switch type turn-on or cut-off, or to regulate the impedance of the power control unit (903), to decrease the current passing through the AC-DC main load (901); and current detector (905): related to a current detector constituted by electromechanical and/or solid-state electronic components, for detecting the value of the current passing through one of the AC-DC main load (901) and the rectifier diode (902), or the total load of the both connected in series, to regulate the power control unit (903) over the following functions, including:

if the current detected by the current detector (905) is lower than a predetermined value, the power control unit (903) is operated to perform shunt regulation of PWM, shunt regulation of conductive phase angle, or shunt regulation of switch type turn-on or cut-off, or to regulate the impedance of the power control unit (903), to increase the current passing through the AC-DC main load (901); or if the current detected by the current detector (905) is higher than a predetermined value, the power control unit (903) is operated to perform shunt regulation of PWM, shunt regulation of conductive phase angle, or shunt regulation of switch type turn-on or cut-off, or to regulate the impedance of the power control unit (903), to decrease the current passing through the AC-DC main load (901).

Figure 10:
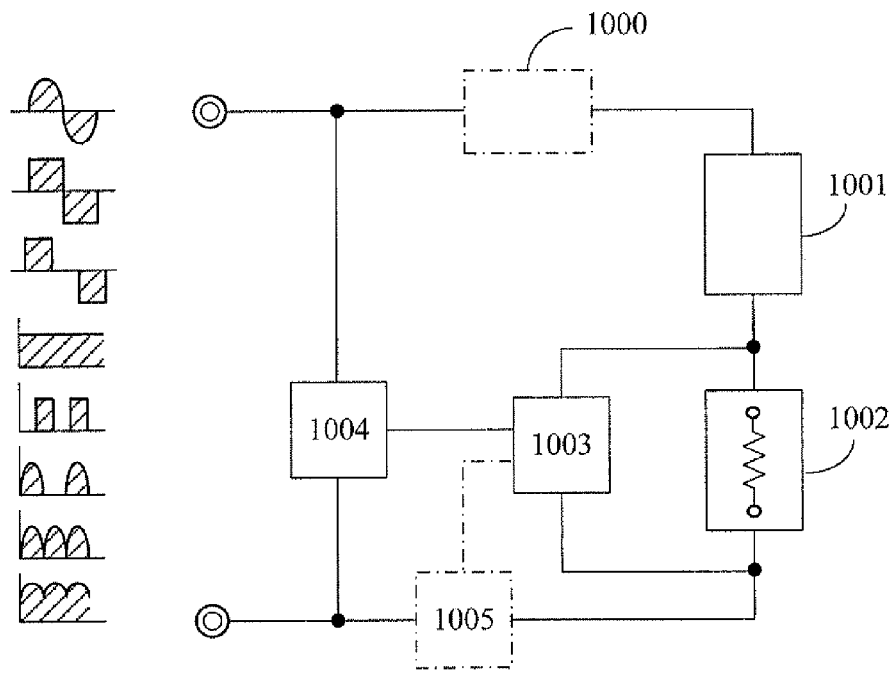
FIG. 10 is a schematic view showing the circuit blocks of the 7th embodiment of the present invention.

FIG. 10 shows the 7th embodiment of the present invention, for applying to a main load, which has the impedance element as voltage-dividing component, driven by AC or DC power source, the main components including:

main load (1001): related to a main load driven by AC, DC, or pulsating DC power, constituted by one or more than one kind of main loads including electric energy to luminous energy main load, electric energy to thermal energy main load, electric energy to mechanical energy main load, electric energy to chemical energy main load, and electric energy to acoustic energy main load;

voltage-dividing impedance (1002): related to a impedance component allowing one or more of AC, DC, or pulsating DC power passing through, which is constituted by one or more than one kind of resistive and/or inductive and/or capacitive impedance components, and is arranged to be connected with the main load (1001) in series and connected with the power control unit (1003) in parallel, for the current passing through the voltage-dividing impedance (1002) to be shunted regulation in parallel connection by the power control unit (1003);

power control unit (1003): constituted by electromechanical switch device, solid-state semiconductor-type switch device, or solid-state semiconductor-type linear variable impedance device, for being controlled by the voltage detector (1004) and/or the current detector (1005), to perform shunt regulation of PWM, shunt regulation of conductive phase angle, or shunt regulation of switch type turn-on or cut-off, or to regulate the impedance of the power control unit (1003), to shunt regulation for the current passing through the voltage-dividing impedance (1002);

voltage detector (1004): related to a voltage detector constituted by electromechanical and/or solid-state electronic components, for detecting the supply voltage, or the value of the voltage at two ends of one of the main load (1001) and the voltage-dividing impedance (1002), or of the total load of the both connected in series, to regulate the power control unit (1003) over the following functions, including:

if the voltage detected by the voltage detector (1004) is lower than a predetermined value, the power control unit (1003) is operated to perform shunt regulation of PWM, shunt regulation of conductive phase angle, or shunt regulation of switch type turn-on or cut-off, or to regulate the impedance of the power control unit (1003), to increase the current passing through the main load (1001); or if the voltage detected by the voltage detector (1004) is higher than a predetermined value, the power control unit (1003) is operated to perform shunt regulation of PWM, shunt regulation of conductive phase angle, or shunt regulation of switch type turn-on or cut-off, or to regulate the impedance of the power control unit (1003), to decrease the current passing through the main load (1001); and current detector (1005): related to a current detector constituted by electromechanical and/or solid-state electronic components, for detecting the value of the current passing through one of the main load (1001) and the voltage-dividing impedance (1002), or the total load of the both connected in series, to regulate the power control unit (1003) over the following functions, including:

if the current detected by the current detector (1005) is lower than a predetermined value, the power control unit (1003) is operated to perform shunt regulation of PWM, shunt regulation of conductive phase angle, or shunt regulation of switch type turn-on or cut-off, or to regulate the impedance of the power control unit (1003), to increase the current passing through the main load (1001); or if the current detected by the current detector (1005) is higher than a predetermined value, the power control unit (1003) is operated to perform shunt regulation of PWM, shunt regulation of conductive phase angle, or shunt regulation of switch type turn-on or cut-off, or to regulate the impedance of the power control unit (1003), to decrease the current passing through the main load (1001).

The invention claimed is:

1. A current regulator drive circuit, comprising:
a first power source input terminal and a second power source input terminal for connecting the current regulator drive circuit to either of an AC power source and a DC power source;
a main load having a first main load terminal and a second main load terminal;
a voltage-dividing load having a first voltage-dividing load terminal and a second voltage-dividing load terminal, wherein:
a power control unit having a first power control unit terminal, a second power control unit terminal, and a third power control unit terminal, wherein:
the first main load terminal is connected to the first power source input terminal;
the second main load terminal is connected to the first voltage-dividing load terminal and to the first power control unit at a first node; and
the second voltage-dividing load terminal is connected to the second power source input terminal and to the second power control unit terminal at a second node;
at least one of a voltage detector installed in parallel with the main load, voltage-dividing load, or series-connected main and voltage-dividing loads, and a load current detector connected in series with one of the power source inputs, one or both of said at least one of a voltage detector and the current detector being further connected to the third power control unit terminal,
wherein said power control unit increases a shunt current through the power control unit in response to detection by said one or both of said at least one of a voltage detector and the load current detector that the voltage or current detected by said one or both of at least one of a voltage detector and the load current detector is less than a predetermined minimum value, and decreases the shunt current through the power control unit in response to detection by said one or both of said at least one of a voltage detector and the load current detector that the voltage or current detected by said one or both of said at least one of a voltage detector and the load current detector is greater than a predetermined maximum value.

2. A current regulator drive circuit as claimed in claim 1, wherein the shunt current though the power control unit is increased or decreased by causing the power control unit to perform one of pulse width modulation, conductive phase angle control, on and off control of a switch, and impedance control of the power control unit.

3. A current regulator drive circuit as claimed in claim 1, wherein the main load is driven by at least one of DC, AC, and pulsating DC power, and includes one or more loads that convert electric energy to luminous, thermal, mechanical, chemical, or acoustic energy.

4. A current regulator drive circuit as claimed in claim 3, wherein the voltage-dividing load is a same type of load as the main load.

5. A current regulator drive circuit as claimed in claim 1, wherein the voltage-dividing load is a different type of load than the main load, is driven by at least one of DC, AC, and pulsating DC power, and includes one or more loads that convert electric energy to luminous, thermal, mechanical, chemical, or acoustic energy.

6. A current regulator drive circuit as claimed in claim 1, wherein the power control unit includes at least one of an electromechanical switch, solid state semiconductor switch device, and solid state semiconductor linear variable impedance device.

7. A current regulator drive circuit as claimed in claim 1, wherein the voltage detector is arranged to detect a value of a voltage at two ends of one of the main load and the voltage-dividing load or a total voltage of both the main load and voltage-dividing load.

8. A current regulator drive circuit as claimed in claim 1, wherein the current detector is arranged to detect a value of a current passing through one of the main load and the voltage-dividing load, or a total current passing through both the main load and the voltage-dividing load.

9. A current regulator drive circuit as claimed in claim 1, wherein the current regulator drive circuit is a DC power source circuit.

10. A current regulator drive circuit as claimed in claim 1, wherein the current regulator drive circuit is an AC power source circuit.

11. A current regulator drive circuit as claimed in claim 1, wherein the main load and voltage-dividing load each includes one or more LEDs connected in series, parallel, or series and parallel combinations, and driven by DC power or pulsating DC power.

12. A current regulator drive circuit as claimed in claim 1, wherein the main load and voltage-dividing load each includes one or more AC LEDs connected in series, parallel, or series and parallel combinations, wherein said AC LEDs each comprises at least two LEDs parallel connected in reverse polarity for being driven by AC power.

13. A current regulator drive circuit as claimed in claim 1, wherein the main load and voltage-dividing load each includes an exothermal device that converts electric energy to thermal energy.

14. A current regulator drive circuit as claimed in claim 1, wherein the main load is a DC main load and the voltage-dividing load includes one or more Zener diodes connected in series, parallel, or series and parallel combinations and driven by DC or pulsating DC power.

15. A current regulator drive circuit as claimed in claim 1, wherein the main load is an AC main load and the voltage-dividing load includes at least two Zener diodes having different polarities to permit AC current to pass through the AC main load.

16. A current regulator drive circuit as claimed in claim 1, wherein the main load is an AC-DC main load driven by either an AC or DC power source and the voltage-dividing load includes one or more rectifier diodes connected in series, parallel, or series and parallel combinations to serve as a switching component for rectifying an AC power source into half-wave DC and a voltage-dividing component arranged to be parallel shunted by the power control unit.

17. A current regulator drive circuit as claimed in claim 1, wherein the voltage-dividing load is an impedance element.

* * * * *